INVENTORS
NORMAN S. POLLACK
ROLAND P. GRIESHAMMER
BY
Lawrence S. Epstein
ATTORNEYS

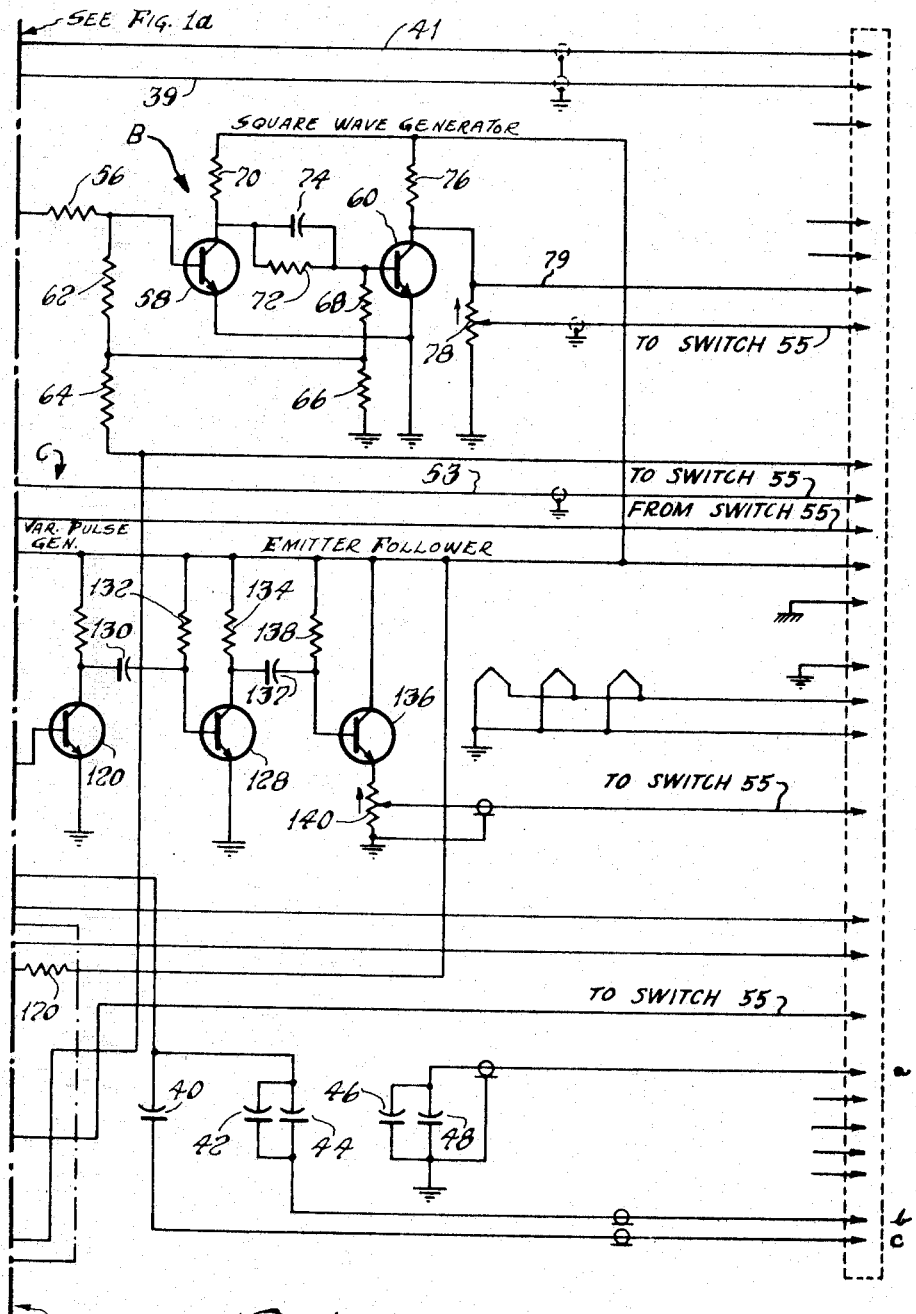

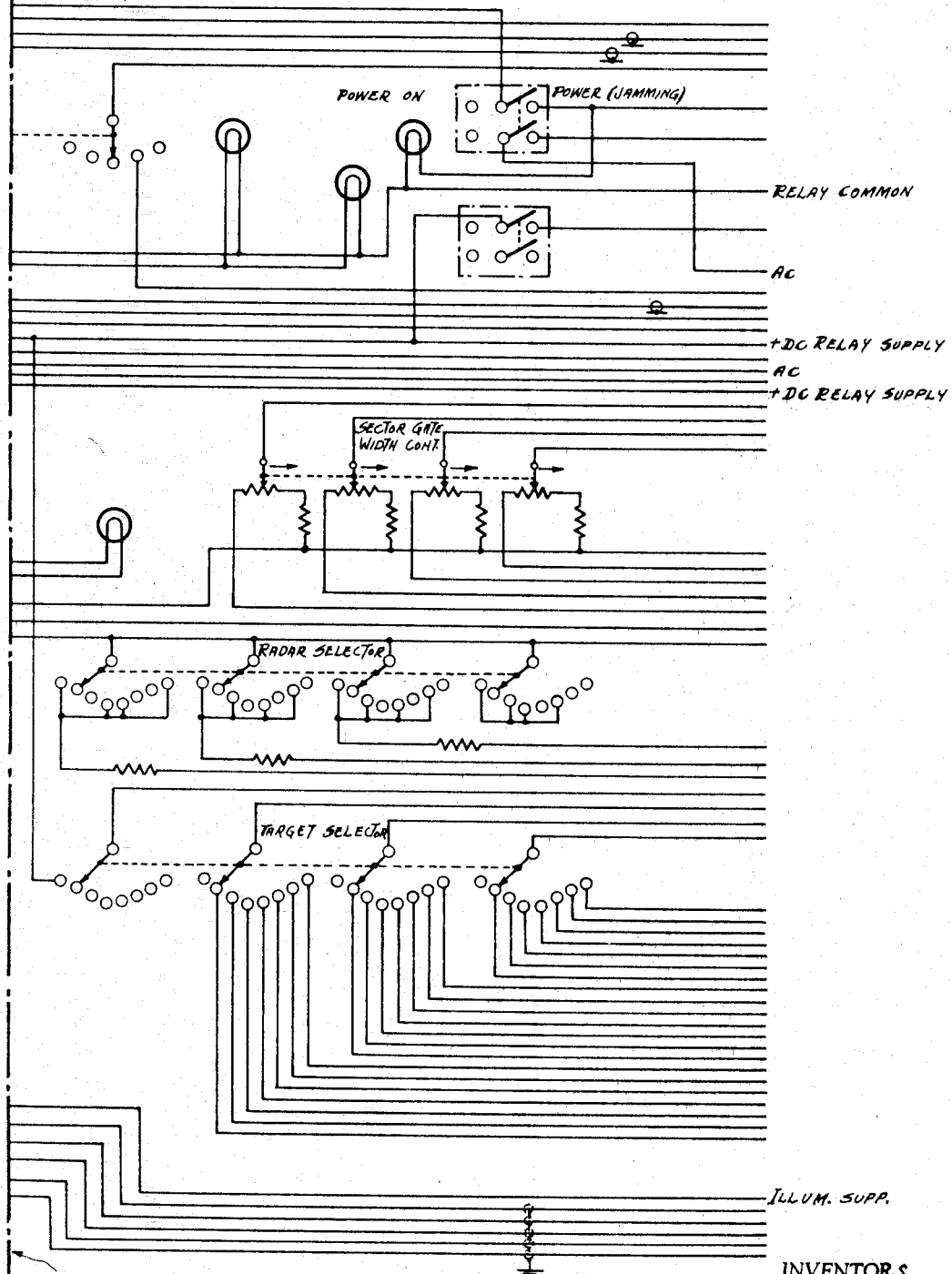

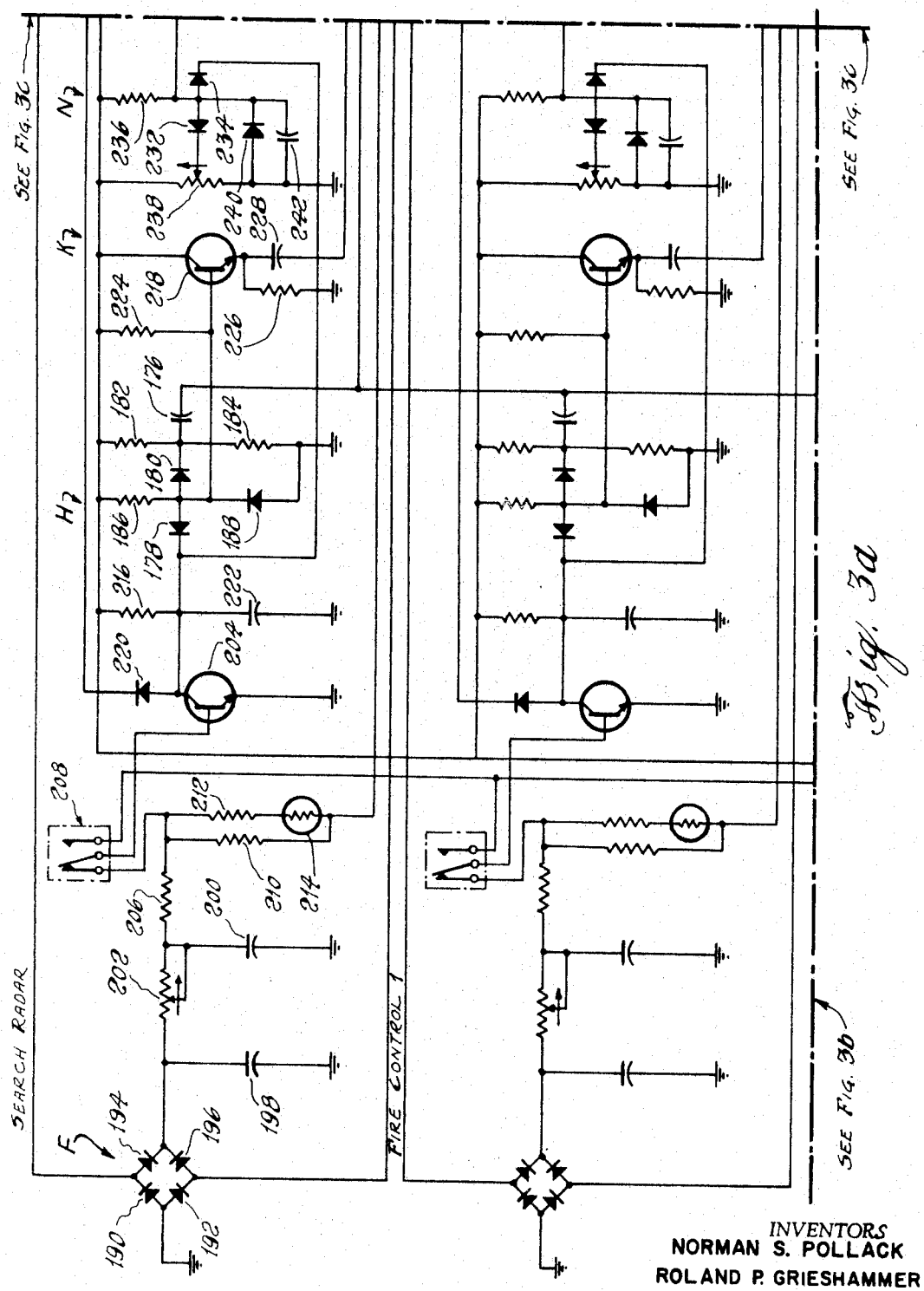

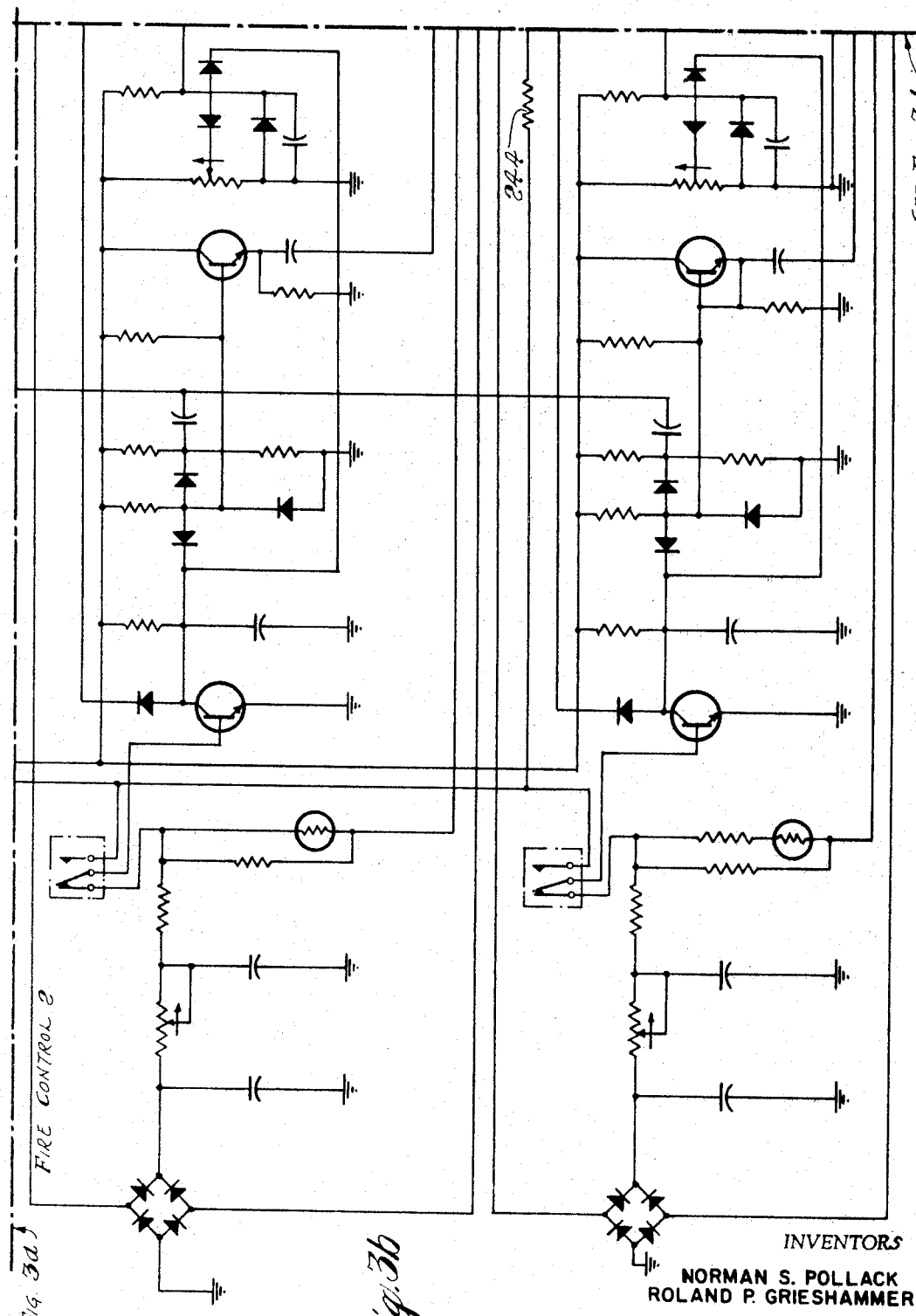

INVENTORS
NORMAN S. POLLACK
ROLAND P. GRIESHAMMER

INVENTORS
NORMAN S. POLLACK
ROLAND P. GRIESHAMMER

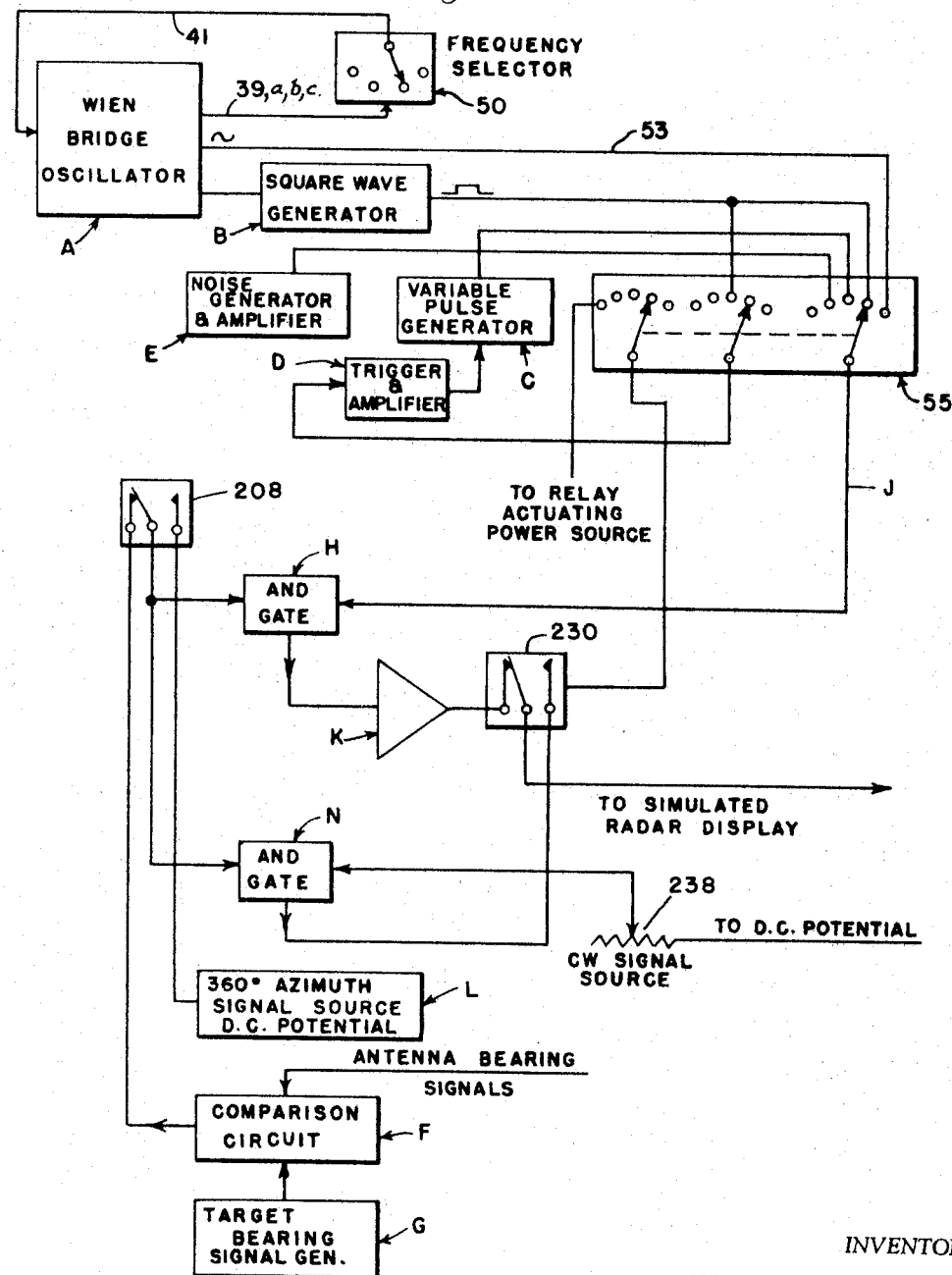

United States Patent Office 3,320,349
Patented May 16, 1967

3,320,349
SIMULATED RADAR JAMMER
Norman S. Pollack, Commack, and Roland P. Grieshammer, Douglaston, N.Y., assignors, by mesne assignments, to the United States of America
Filed Feb. 3, 1965, Ser. No. 430,227
4 Claims. (Cl. 35—10.4)

The present invention relates to radar simulation systems and is particularly directed towards enhancing the realism of simulated targets by providing simulated jamming which is superimposed upon the target video.

In a tactical situation, the radar operator is usually faced with a video presentation of enermy targets which are partially cancelled by enemy jamming.

Jamming techniques may be classified into two basic categories, deceptive jamming and brute force jamming. In deceptive jamming, the enemy target simulates false targets and transmits these to the radar, producing many false target blips on the video display. In brute-force jamming, the enemy generates and transmits, to the radar, many spurious signals modulated at the radar frequency, which mask the actual target blip on the video display. The latter of these jamming techniques is simulated by the subject invention. Simulated jamming, therefore, may be used to obscure simulated targets and train radar operators in the utilization of jamming countermeasures equipment.

It is therefore an object of the instant invention to provide a novel radar jamming simulator for use in training devices.

A further object is to provide a novel apparatus for simulating a number of different types of jamming, said novel apparatus being light in weight and size and inexpensive in cost.

Still another object is to provide a novel radar jamming simulator which provides five different types of jamming signals; i.e., square wave, sine wave, pulse, noise and continuous wave.

Yet another object is the provision, in a radar simulator apparatus, of an improved jamming signal generating device including novel means for gating jamming signals to a simulated radar display means only during that portion or sector of azimuth when the bearing of the antenna coincides with the bearing of a simulated target.

Still another object is the provision of means for alternatively either gating jamming signals only during coincidence of antenna and target bearing as stated in the preceding paragraph, or gating jamming signals throughout 360° of azimuth, i.e., during the entire sweep of the antenna.

As another object the invention aims to accomplish the foregoing through the provision, for example in a radar simulator apparatus having means such as a rotatable transformer for generating simulated antenna bearing signals and a simulated radar display means, of a device comprising signal generator means for generating simulated jamming signals, rotary transformer means for generating simulated target bearing signals, comparison means responsive to the antenna bearing signals and to the target bearing signals to provide azimuth signals corresponding to coincidences of antenna and target bearings, and "and" gate means connected to the signal generator means and responsive to the azimuth signals to pass the jamming signals as an output for use by the display means. Preferred embodiments of the invention include a first source of direct current potential as a 360° azimuth signal, and relay means operable to connect the "and" gate means alternatively to the comparison means or to the source of direct current potential, whereby the "and" gate can be made responsive to the first mentioned azimuth signals or to the 360° azimuth signal to pass the jamming signals to the display means.

In the preferred embodiment which is also capable of providing CW (continuous wave) as a jamming signal, the invention contemplates provision of a second source of direct current potential for use as the continuous wave jamming signal, second "and" gate means connected thereto and to the relay means for alternative connection of the second "and" gate means to the comparison means or to the first source of direct current potential whereby the second "and" gate means can be made responsive to the first mentioned azimuth signals or to the 360° azimuth signal to pass the continuous wave jamming signal, and second relay means operable to connect a simulated radar display means alternatively to the output of the first mentioned "and" gate means or to the output of the second "and" gate means.

Other objects and many of the attendant advantages of this invention will be readily appreciated as the same becomes better understood by reference to the following detailed description when considered in connection with the accompanying drawings wherein:

FIGS. 1a–1b are a detailed schematic diagram of the oscillator and pulse generator unit;

FIGS. 2a–2b are a simplified schematic diagram of the switching circuitry;

FIG. 5 is a block schematic diagram functionally illustrating a simulator device embodying the invention.

Figure 1A:
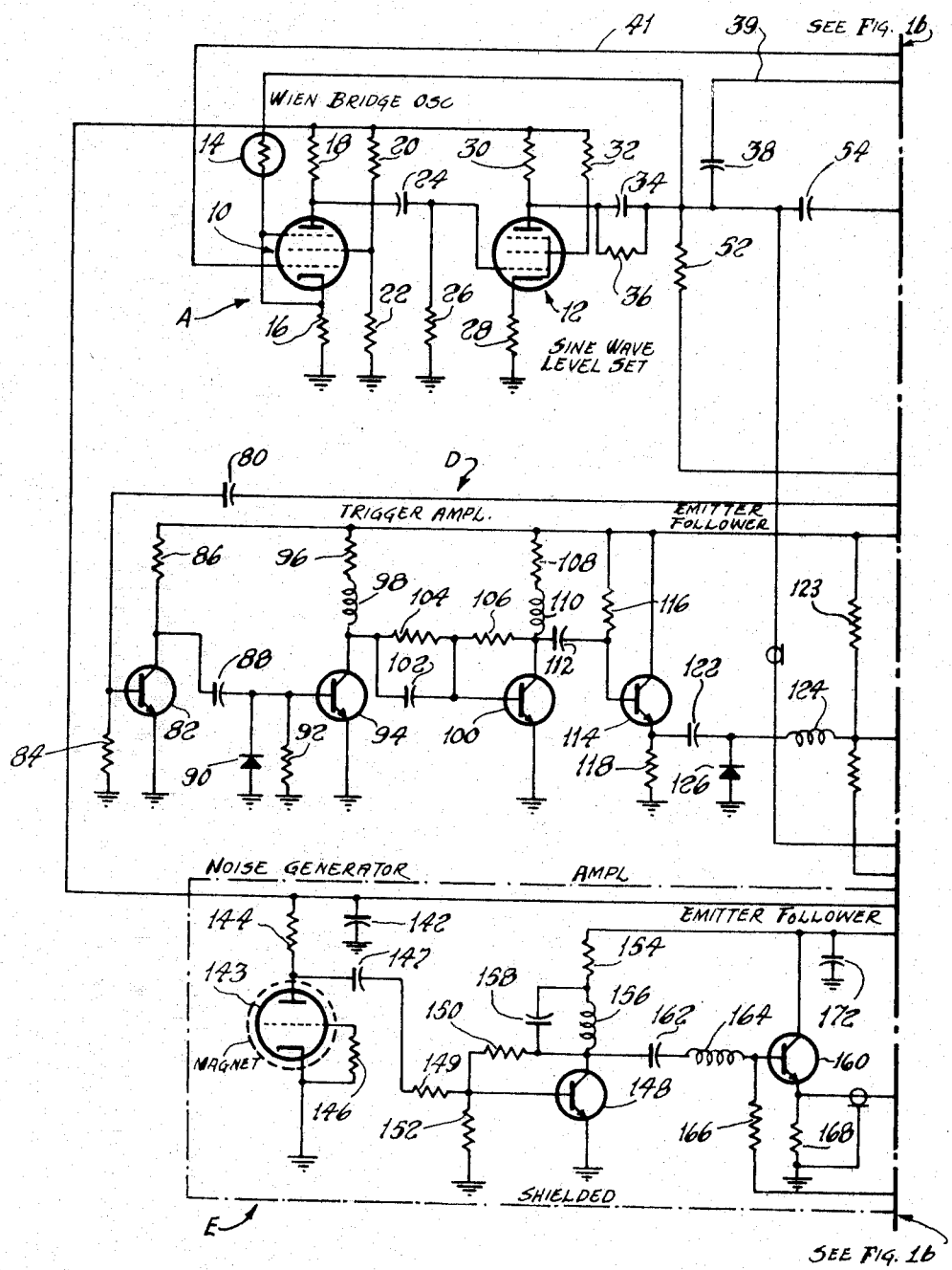

A brief discussion of a radar simulator device embodying the invention will first be given with reference to FIG. 5, following which will be given a more detailed description of the various elements thereof with reference to FIGURES 1–4. A Wien bridge oscillator, generally indicated at A, provides a sine wave output in a manner described more fully hereinafter, the frequency of which is controlled by a variable feed-back circuit including conductor means, later referred to as 39, a, b, and c, a frequency selector switch 50, and a conductor 41. The principal sine wave output of the oscillator A appears on a conductor 53 and may be varied in frequency by adjustment of the frequency selector switch 50. The conductor 53 is connected to a modulation selector switch 55, the purpose of which switch is to permit selection of any one of five types of jamming signals, namely, sine wave, square wave, pulse, continuous wave, and noise.

The modulation selector switch 55 is schematically shown as comprising a plurality of switch contacts and contactors for effecting the mentioned selection of jamming signals. Square wave jamming signals are generated by a square wave generator B which receives sine wave output from the oscillator A and shapes the wave in a manner later described in detail to provide square wave signals to the modulation selector switch 55.

The selector switch 55 is provided with pulse type jamming signals by a variable pulse generator C which is triggered by pulses derived from a trigger generator and amplifier D which in turn derives its output pulses from the output of the square wave generator B.

A noise generator, generally indicated at E, later described in detail, provides noise type jamming signals to the modulation selector switch 55 over suitable conductor means as shown.

The device forms part of a radar simulator apparatus (not shown) which includes rotary transformer means which provides signals corresponding to simulated antenna bearing to a comparison circuit generally indicated at F, while simulated target bearing signals are generated by other rotary transformer means, generally indicated at G, and supplied to the comparison circuit.

The comparison circuit F provides D.C. potentials as azimuth signals indicative of antenna and target bearing coincidences. These azimuth signals are utilized to gate a selected simulated jamming signal to a simulated radar display (not shown) forming a part of radar simulator apparatus but not forming part of the invention per se. To this end, the output of the comparison circuit F is connected through a relay 208 to a first "and" gate means, generally indicated at H and having as a second input simulated sine, square, pulse, or noise type jamming signals from the modulation selector switch 55 via a conductor J. Presence of an azimuth signal at the "and" gate H gates the selected one of the just mentioned jamming signals as an output to the radar simulator display via amplifier means K and a second relay means 230, the purpose of which relay means will presently be made apparent.

The purpose of the first relay means 208 is to provide alternative connection of the "and" gate means H to the comparison circuit F or to a source of D.C. potential L which serves as a 360° azimuth signal. When the "and" gate is connected by the relay 208 to the source of the 360° azimuth signal, the "and" gate H is continuously enabled to pass the selected simulated jamming signal to provide a radar display simulating reception of the jamming signal throughout the entire sweep of the antenna.

A second source of D.C. potential is connected via variable resistance 238 and suitable conductor means as a continuous wave jamming signal input to a second "and" gate N. The "and" gate N, like "and" gate H, can be connected by the relay 208 alternatively to the comparison circuit F or to the D.C. source L so as to receive either azimuth signals of antenna and target bearing coincidences, or a 360° azimuth signal for enabling the "and" gate to pass the continuous wave simulated jamming signal. The output of the "and" gate N is connected through the relay 230, when actuated, to provide a simulated continuous wave jamming signal to the radar display. Actuation of the relay 230 is effected by adjusting the modulation selector switch 55 to a position for selecting continuous wave jamming simulation.

Figure 2A:
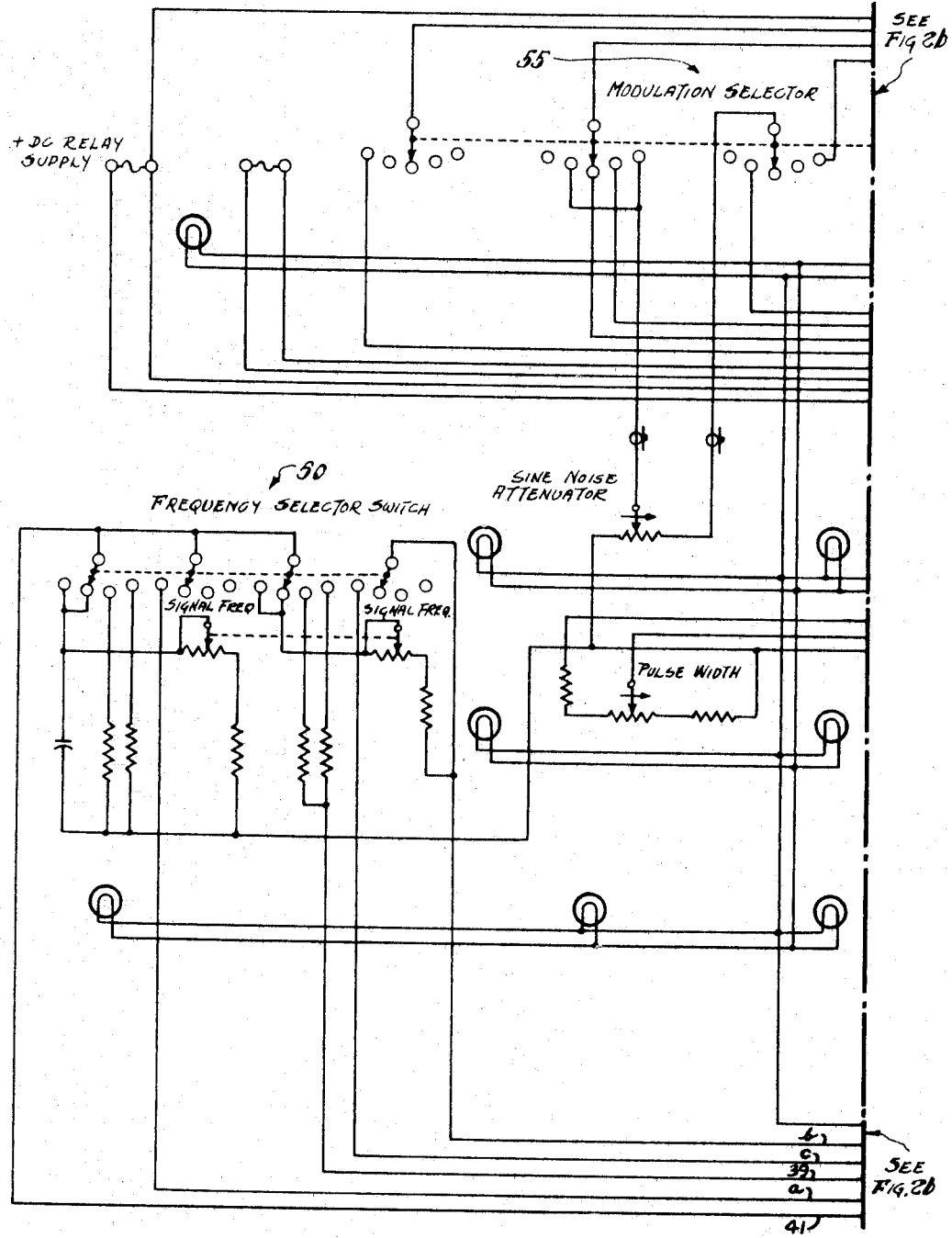

Referring now to FIG. 1, tubes 10 and 12 comprise the Wien bridge oscillator circuit A. Thermistor 14 provides temperature compensation of the Wien bridge oscillator's 250 volt D.C. source. The cathode resistor 16 of the tube 10 is used as part of the voltage divider network necessary in the Wien bridge oscillator. Resistor 18 is the plate load of tube 10. Resistors 20 and 22 comprise a voltage divider for the screen grid of tube 10. The output of this section of the Wien bridge oscillator is capacitively coupled to the grid of tube 12 through capacitor 24. Resistor 26 is the grid bias resistor of tube 12. Resistor 28 is the cathode resistor. Resistor 30 is the plate load, and resistor 32 is the screen grid load. The output of the plate is fed back to the first stage via capacitor 34 and resistor 36. Another signal is fed out of the preferred embodiment of the invention through capacitor 38. This output signal is coupled over line 39 through front panel controls, of the preferred embodiment of the jammer where the proper capacitor and variable resistor loads are available for the second loop of the feedback required in the Wien bridge oscillator. These front panel controls (a frequency selective switch) are able to vary these elements so as to change the frequency of the Wien bridge oscillator from 15 cycles to 100,000 cycles. The secondary feedback loop from this front panel is fed back, over line 41, to the grid of tube 10. This, therefore, comprises the Wien bridge oscillator which generates a sine wave essentially free of distortion. FIG. 2 is provided to indicate the entire closed loop of the Wien bridge oscillator.

A second part of the feedback loop is taken from capacitors 40, 42 and 44. Also included as part of the frequency determining means for the Wein bridge oscillator are capacitors 46 and 48. It can be seen that this is part of the frequency determining means when reference is made to FIG. 2. The switch 50 is shown in position No. 2 and varies the output from 500 cycles to 10,000 cycles. In position 1, the Wien bridge can be varied from 15 cycles to 550 cycles. In position 3, it has a fixed frequency of 50,000 cycles and in position 4 it has a fixed frequency of 100,000 cycles. Tubes 10 and 12, with their associated circuitry, and the resistors, capacitors, potentiometers and switch shown in FIG. 2, comprise the Wien bridge oscillator used in the jammer. Another signal is fed out to the front panel through resistor 52, over line 53, to modulation section switch 55 which selects the types of signals presented to radar indicators as jamming. This particular resistor 52 carries the sine wave signal. Another output from the Wien bridge oscillator is fed to the square wave generator B which generates square waves. The sine wave is fed to the square wave generator through capacitor 54 and resistor 56. Squaring transistors 58 and 60 are operated such that they are either completely saturated or turned off, and therefore generate square waves as a function of the input sine waves. Resistor 62 is the base bias resistor of transistor 58. Resistors 64 and 66 provide the bias voltage of this transistor as well as the base bias voltage of transistor 60. Resistor 68 is part of the base biasing network of transistor 60. Resistor 70 is the collector load of transistor 58. The output of transistor 58 is capacitively and resistively coupled, for maximum frequency response, to transistor 60 through resistor 72 and capacitor 74. This generates square waves at the frequency determined by the signal from the Wien bridge. Resistor 76 is the collector load of transistor 60. Resistor 78 is a potentiometer which may attenuate the output square wave. The potentiometer resistor 78, which has its arm connected to the modulation selector switch 55 on the front panel, may be bypassed by line 79 which is connected to suitable switch means (not shown) for that purpose. The operator can select between square waves and any other four inputs to the modulation select switch 55.

In the pulse position, the output of transistor 60 is fed to the modulation switch 55 and then back to the base of transistor 82 through capacitor 80. This transistor 82 supplies additional amplification of the square wave. Resistor 84 is the base bias resistor and resistor 86 is the collector load. The output of this amplifier is differentiated and clipped by capacitor 88, diode 90, and resistor 92. This is fed to the base of transistor 94 which together with its associated circuitry comprises the trigger generator and amplifier D and generates the trigger necessary to trigger the pulse generator. Resistor 96 is the collector load of transistor 94. Inductor 98 is provided for inductive filtering. The output is passed to transistor 100 via pulse shaping network C comprising capacitor 102, resistor 104, and resistor 106. The collector load of transistor 100 is resistor 108 in series with inductor 110, which provides inductive filtering. The output of this amplifier is fed to an emitter follower through capacitor 112. The base resistor of emitter follower transistor 114 is 116. The emitter resistor is 118. The output of the emitter follower is capacitively coupled to a variable pulse generator transistor 120, through capacitor 122.

The width of the pulse is determined by the D.C. voltage, fed into the base of transistor 120 via resistor 123. Stretching is accomplished by the inductive action of inductor 124 and the clipping diode 126. The output of the variable pulse generating transistor 120, is fed to transistor 128 of an emitter follower, through capacitor 130. The bias base resistor of transistor 128 is 132. The collector load is 134. The output taken from the collector is fed to the base of transistor 136 through capacitor 137. The base bias resistor is 138. Transistor 136 is an emitter follower whose emitter load is 140, which is a potentiometer (which determines the pulse amplitude out of this unit). The output pulse is fed to the modulation switch as previously described.

The final output of this unit is noise. Noise is generated by the noise generator E which comprises a thyratron gas tube 143, which is biased near conduction. The random manner in which this tube conducts gives rise to a noise spectrum required for the jammer. A magnet is placed around the thyratron 143, to increase the frequency spectrum of the noise. Capacitor 142 is used as a decoupling capacitor for the plus 250 volt supply. Resistor 144 is the plate load of the thyratron noise generator, and resistor 146 is the grid bias resistor. The output of the noise generator is then coupled to an amplifier, to transistor 148 through capacitor 147 and resistor 149. Transistor 148 is base biased by resistors 150 and 152. The collector load of this transistor 148 is resistor 154 and it is peaked by inductor 156 and capacitor 158. The output of this amplifier is fed to emitter follower transistor 160, through capacitor 162 and inductor 164, which provide series peaking. The base biasing resistor of this amplifier is resistor 166. Resistor 168 is the emitter load of emitter follower transistor 160. Resistor 170 and capacitor 172 comprises a decoupling network for the collector voltages of transistors 148 and 160.

In order to present the jamming signal generated by the oscillator and pulse generator at the proper azimuth, a sector gate is required. The circuit described herein gates the jamming signal when the jamming target is within the antenna beamwidth. It should be noted that the circuit was developed for use in a simulator requiring jamming on all search, fire control and height finder radars. The comparison of target and antenna bearing for each radar is accomplished elsewhere in the simulation system and is fed to this circuit as a comparison voltage.

Figure 3C:
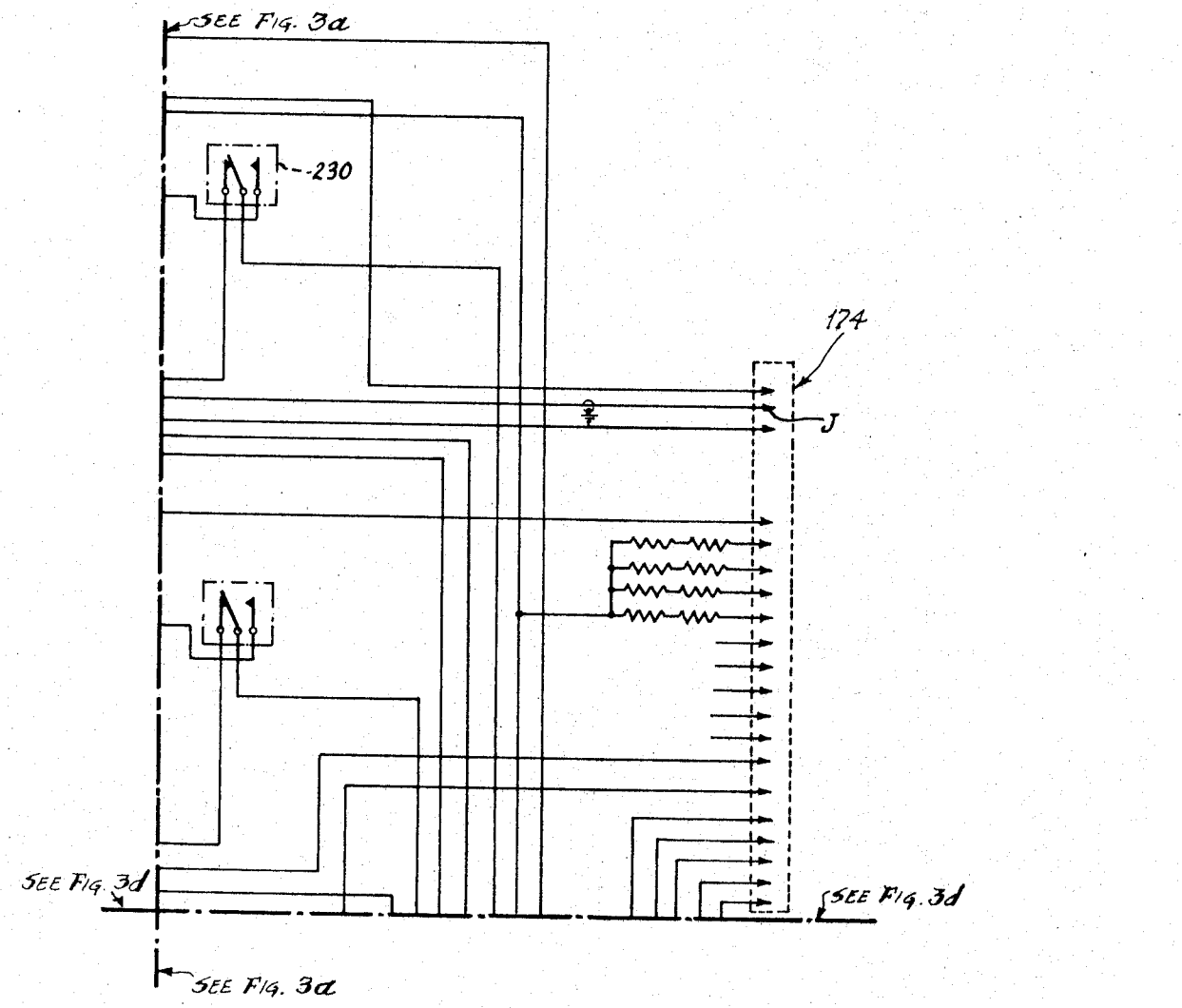
FIGS. 3a–3b are a schematic diagram of the sector and coincidence gate circuitry.
Figure 3D:
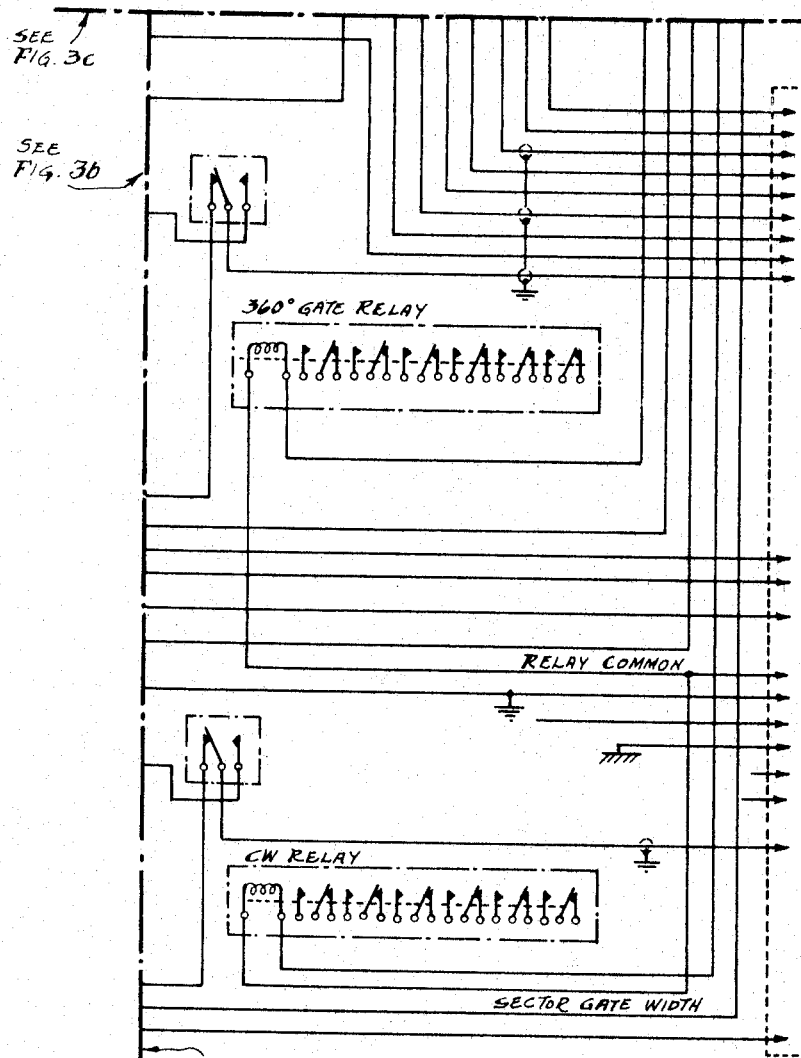

Four similar circuits are illustrated in FIG. 3; however, only one will be described. The type of jamming is preselected and fed from switch 55 into the circuit at conductor J of connector 174. It is fed into a capacitor 176 and then to an "and" circuit H consisting of diode 178, diode 180 and resistor 182.

This "and" circuit is biased by resistors 182 and 184. Resistor 186 is a pull-up resistor, and diode 178 couples the azimuth or bearing gate signal (described infra) into the "and" circuit. When the target is within the selected beamwidth, the jamming will appear over this entire width. Diode 188, is a clipping diode, which removes any jamming that occurs below the ground line.

The operation of the bearing gate is as follows: Synchro information (from a control transformer in the sector gearing unit), which is a result of the comparison between target and antenna bearing, is applied across bridge detector's diodes 190, 192, 194 and 196. The output of this bridge rectifier is fed to a filter network consisting of capacitor 198, capacitor 200 and resistor 202. Resistor 202 may be adjusted to provide the proper beamwidth. The output of this filter is fed to transistor 204, through resistor 206 and relay 208. This transistor is biased by resistors 210 and 212, and thermistor 214. The junction of resistor 210, and thermistor 214, is fed to a voltage divider network which controls the width of the target. Thermistor 214 is used for temperature compensation. Relay 208 is in the normally closed position for a beamwidth of less than 360°. For a beamwidth of 360°, this relay connects the base of transistor 204 to a negative voltage, thereby always cutting off transistor 204. In the first mode (less than 360°) the transistor is cut off during the time the target and director are within the beamwidth specified at the front panel. During that time, transistor 204 is open circuited and resistor 216, which is the collector load, draws the cathode of diode 178 to +28, thereby enabling the "and" circuit H, and allowing the jamming to pass through to transistor 218. If this particular radar has not been selected to receive jamming, diode 220 (which is connected to the front panel switch that selects the radar to be jammed) is grounded, thereby shorting out the "and" circuit and thus blocking the jamming signal. Capacitor 222 further filters the signal generated by transistor 204. The jamming, out of the "and" circuit, is fed to transistor emitter follower 218. Resistor 224 is the base biasing resistor. Resistor 226 is the emitter load and capacitor 228 is the output coupling capacitor. In the normal mode when relay 230 is not energized, the output is taken directly from capacitor 228. Relay 230 is energized in the CW mode. In the CW mode, the CW signal from the "and" circuit N, diodes 232 and 234 and resistor 236 is fed out as the output of this circuit. The input to the "and" circuit N is D.C. level, which is the level of the CW signal, set by potentiometer 238. This is fed to diode 232 of the "and" circuit N. Resistor 236 functions as the pull-up resistor. Diode 240 is the clipping diode, and capacitor 242 is used for filtering of the azimuth gate signal. The azimuth gate signal that is fed to the normal jamming "and" circuit H at the cathode of diode 178 is also fed to the cathode of diode 234 and functions as the azimuth gate signal in the "and" circuit N, on the CW signal. In the CW mode, the output of this "and" circuit is fed out as jamming.

Figure 4A:
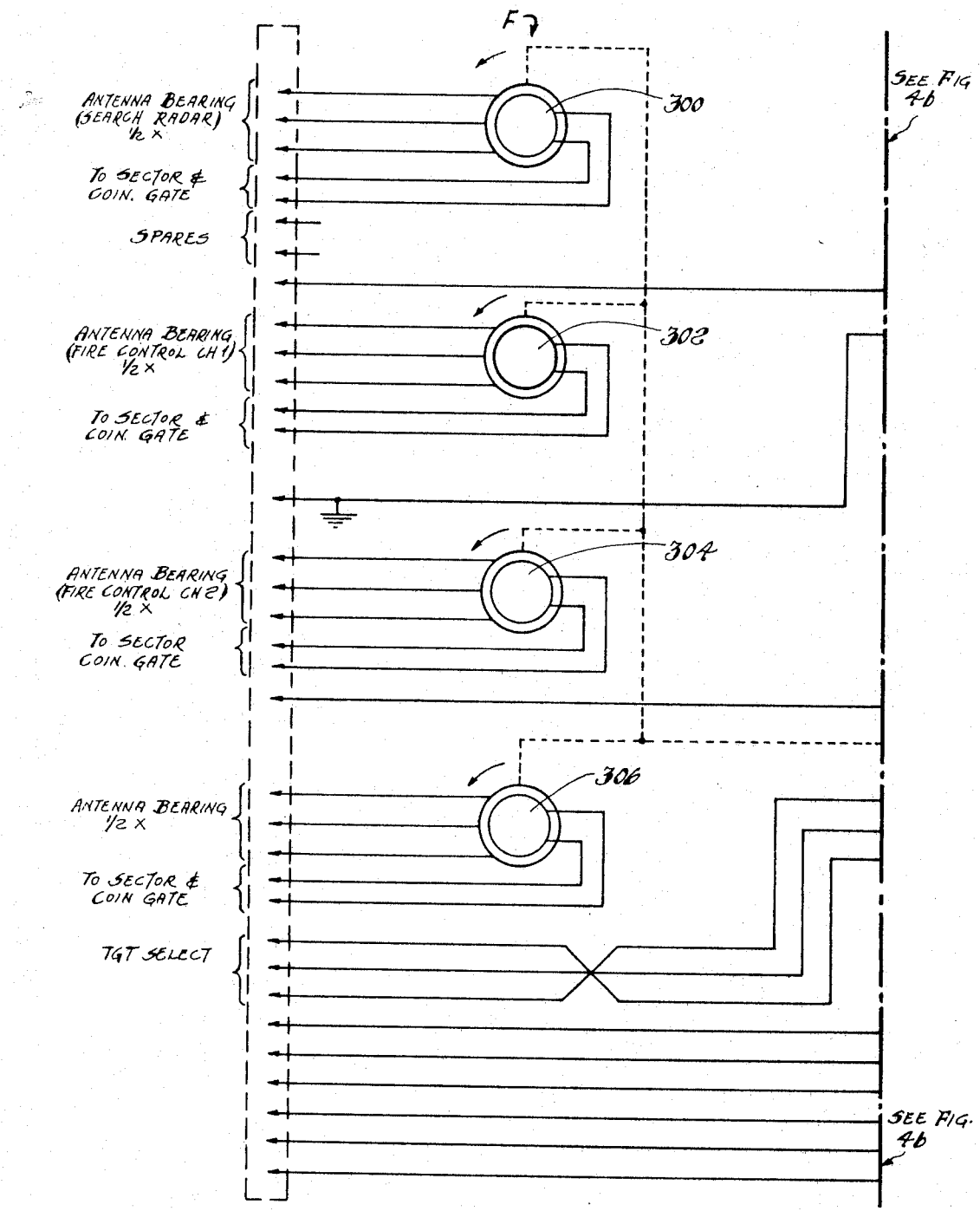
FIGS. 4a–4b are a schematic diagram of the sector gate position servo and associated circuitry.
Figure 4B:
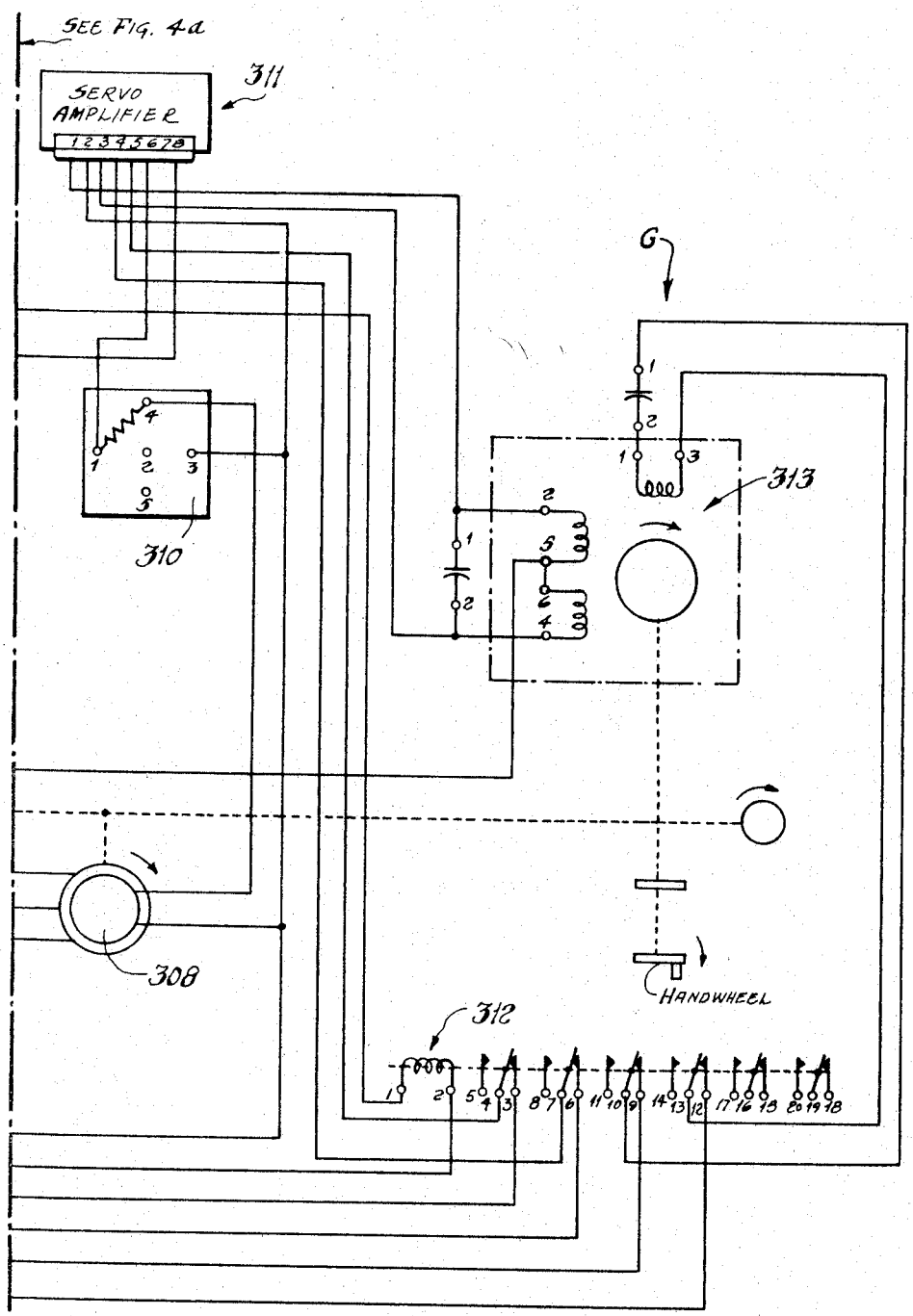

In order to generate the azimuth gate signal at the proper azimuth, a comparison must be made between the jamming target azimuth and the director azimuth of the radar that is being jammed. This comparison is made in a control transformer, whose output is fed to the bridge detector on the sector and coincidence gate unit. Referring to FIG. 4, the outputs of the four control transformers 300, 302, 304 and 306, are fed to the sector and coincidence gate unit. Each of the transformers is fed by a particular antenna bearing which is taken at ½ speed of the actual antenna bearing. This ½ speed function is necessary to take into account the two nulls generated by a control transformer. S1 and S2 and S3 of each transformer is fed by appropriate antenna synchro signals. The control transformer is driven by target position. The output of the control transformer, as previously stated, is fed to the sector and coincidence gate unit. In order to drive these transformers, a target follow-up servo is necessary.

Target information fed into control transformer 308 is selected from the front panel. The output of the control transformer is fed to a resonant clamp 310 which is used for filtering, and then to a servo amplifier 311. The output of this servo amplifier is fed to the control fields of a motor 313. The fixed field winding is fed from a reference. The output of this motor is coupled to all the control transformers in this network. When it is coupled to the control transformer that receives the target information, the output of this control transformer 306 detects when the angle of this control transformer corresponds to the angle of the input. It therefore, follows-up the target angle and drives the shafts of the comparison control transformer such that azimuth gating is provided. The relay 312 is de-energized when the jammer is in the manual position. This allows the servo gear train to be driven from the front panel and set-up as a manual target.

Thus it is seen that with the use of simple circuits, a circuit is provided which simulates jamming signals.

Obviously, many modifications and variations of the present invention are possible in the light of the above teachings. It is therefore to be understood that within the scope of the appended claims the invention may be practiced otherwise than as specifically described.

What is claimed is:
1. In a radar simulator apparatus having rotary transformer means for generating simulated antenna bearing signals and having simulated target display means, a device for supplying to said display means simulated jamming signals, said device comprising;

signal generator means for generating simulated jamming signals;

rotary transformer means for generating simulated target bearing signals;

comparison means responsive to antenna bearing signals and target bearing signals for providing azimuth signals corresponding to coincidences of antenna and target bearings; and "and" gate means connected to said signal generator means and responsive to said azimuth signals to pass said jamming signals as an output for use by said display means.

2. A device as defined in claim 1 and further comprising:

a source of direct current potential as a 360° azimuth signal; and relay means operable to connect said "and" gate means alternatively to said comparison means or to said source of direct current potential, whereby said "and" gate can be made responsive to the first mentioned azimuth signals or to said 360° azimuth signal to pass said jamming signals.

3. A device as defined in claim 2 and further comprising:

a second source of direct current potential for use as a continuous wave jamming signal;

second "and" gate means connected to said second source of direct current potential and to said relay means for alternative connection to said comparison means and said first source of direct current potential, whereby said second "and" gate means is responsive to said first mentioned azimuth signals or to said 360° azimuth signals to pass said continuous wave jamming signal; and second relay means operable to connect a simulated radar display means alternatively to the output of the first mentioned "and" gate means or to the output of said second "and" gate means.

4. A device as defined in claim 3, and:

said signal generator means for generating electronic signals simulative of jamming signals comprises an oscillator for generating sine wave signals and a plurality of other signal generators;

control means for selectively connecting said oscillator and said other signal generators to said first "and" gate means;

at least one of said other signal generators comprising wave shaper means for producing output wave shapes at a frequency controlled by the output of said oscillator.

References Cited by the Examiner

UNITED STATES PATENTS 3,219,744  11/1965  Mazziotti et al. _____ 35—10.4

RODNEY D. BENNETT, *Primary Examiner.*

CHESTER L. JUSTUS, *Examiner.*

T. H. TUBBESING, *Assistant Examiner.*